Nov. 1, 1960

D. R. HAY 2,958,829

REFRACTOMETER COMPRISING A PAIR OF OSCILLATORS
AND BEAT FREQUENCY INDICATING MEANS

Filed Oct. 7, 1957

INVENTOR
DONALD R. HAY

By—Smart+Biggar

ATTORNEYS.

United States Patent Office

2,958,829
Patented Nov. 1, 1960

2,958,829

REFRACTOMETER COMPRISING A PAIR OF OSCILLATORS AND BEAT FREQUENCY INDICATING MEANS

Donald R. Hay, Ottawa, Ontario, Canada, assignor to Her Majesty the Queen in Right of Canada as represented by the Minister of National Defence Filed Oct. 7, 1957, Ser. No. 688,550

5 Claims. (Cl. 331—37)

The invention relates to a refractometer for use in the earth's atmosphere to signal to a remote location indications of refractive index.

Radio propagation at ultra-high and microwave frequencies is affected to a considerable extent by variations in the refractive index of the air making it important in communication at these frequencies to know from time to time the refractive index at various locations (refractive index profile) along the transmission path. Also prediction of the accuracy of search in high resolution radar systems requires detailed knowledge of the refractive-index profile of the air through which the radar signals are transmitted. Even the operation of low resolution radar systems is improved through knowledge of the average refractive-index profile of the air since this indicates the existence of anomalous propagation conditions. Two types of apparatus have been developed for measurement of the refractive index of the air. One is a light-weight electronic instrument in which sensitive elements are provided to measure temperature, air pressure and vapour pressure of the air in contact with the instrument as it is borne aloft by a balloon. The refractive index can be derived from the information provided by the instrument, by use of the known equation:

$$N = (n-1)10^6 = \frac{77.6}{T}\left(p + 4810\frac{P_w}{T}\right) \quad (1)$$

where $N$ = modified index of refraction.
$n$ = index of refraction.
$T$ = absolute temperature.
$p$ = total air pressure (in millibars).
$P_w$ = partial pressure of water vapour (millibars).

Descriptions of this type of instrument are given by D. E. Kerr in "Propagation of Short Radio Waves" MIT Radiation Laboratory Series, vol. 13, chapter 3. The second type of known instrument gives a direct indication of the refractive index of the air sample and is known as a microwave refractometer. The principle of its operation is the comparison of the resonant frequencies of two microwave cavities. One of the cavities is a reference cavity and is sealed while the second cavity is open to the air to be sampled. Since the resonant frequency of a microwave cavity is dependent on the refractive index of the air within it, the difference in the two resonant frequencies of the cavities is a measure of the refractive index of the air being sampled. This type of instrument is described by G. Birnbaum and C. M. Crain in the Review of Scientific Instruments for February and May, 1950.

Both prior art proposals have serious disadvantages. In the case of the light-weight instrument which senses temperature, air pressure and vapour pressure, a somewhat complicated computation (see Equation 1 above) must be performed based on the data obtained from the instrument before the required refractive index can be obtained. In the case of obtaining refractive index profiles the computations are laborious and require a considerable length of time. A further disadvantage is that devices of this type which have been available use temperature and dewpoint sensing elements having slow reaction times, with the result that most of the fine detail desirable in a refractive index profile is not obtainable from air samplings with this device. In the case of the microwave refractometer, fine detail can be measured in a refractive index profile but the instrument itself is complex and is too heavy to be conveniently borne aloft by a balloon. Microwave refractometers ordinarily weigh 100 pounds or more and are usually carried by aircraft through the region to be sampled with the result that the cost of the measurements is high and there are limitations imposed by the manoeuvrability of the aircraft. A further serious disadvantage of the microwave refractometers is that it is necessary to flush out water caused by precipitation from the microwave cavity. Any accumulation of unwanted moisture within the cavity leads to erroneous measurements.

The present invention overcomes the disadvantages of previously known refractometers by providing an instrument which is of light weight but capable of measuring fine detail in the refractive index profile of the air above a selected ground area. A refractometer according to the invention comprises a first stable oscillator adapted to produce a signal of a predetermined radio frequency and a second stable oscillator adapted to produce a second signal of a predetermined radio frequency. The frequency of the second signal is determined by a tuned circuit which has as a tuning element an air dielectric condenser having a plurality of plates exposed to the earth's atmosphere. Means is provided for transmitting to the remote location radio frequency signals indicative of the difference frequency between the first signal and the second signal thereby indicating the refractive index of the earth's atmosphere at the plates of the condenser. The first and second oscillators may be enclosed in a casing adapted to be suspended from a balloon. The air dielectric condenser preferably is mounted on the side of the casing with its plates arranged to extend generally in a vertical direction during the normal ascent and descent of the balloon so that the plates do not tend to collect unwanted moisture. The plates may be covered with a water repellant coating as a further aid in ridding the plates of unwanted moisture. Also it is preferred that the plates be rectangular in shape with their shorter sides in the direction of normal ascent and descent of the balloon and having the plates spaced apart by a distance permitting flow of air between the plates during ascent and descent of the balloon. Preferably the signals from the first and second oscillators differ in frequency by a frequency in the audio range.

Variations in the difference frequency between the frequencies of the first and second oscillators indicate variations in the refractive index of the changing air between the plates. This information can be received on the ground by apparatus of conventional construction and an indication of the difference frequency can be recorded. The position of the refractometer can be tracked by conventional radar equipment and recorded on the same chart as the signal corresponding to the refractive index so that a single chart can provide all the information required to plot a refractive index profile. Computations are not required to obtain the refractive index of the air sampled and, because the refractometer may be tethered to a ground point, it is capable of making repetitive measurements through a given height interval above a selected ground area.

The invention will be further described with reference to the accompanying drawings, in which.

Figure 1:
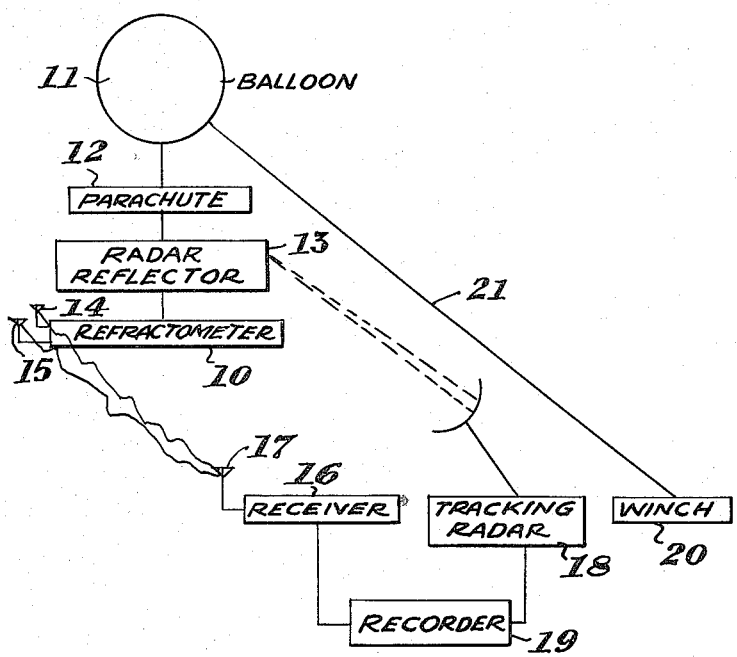
Figure 1 is a block diagram showing a system for obtaining refractive index profiles using a refractometer in accordance with the invention.

Figure 1 shows a block diagram of a complete system for obtaining refractive index profiles using a refractometer 10 in accordance with the invention. The refractometer 10 is suspended from a balloon 11 along with a parachute 12 and a radar reflector 13. The refractometer 10 has two antennas 14 and 15 which transmit signals from the refractometer 10 to a receiver 16 located on the ground and having a receiving antenna 17. A tracking radar 18 of conventional design is also located on the ground and is used to obtain indications of the position of the radar reflector 13. The position indications from the tracking radar 18 are fed to a recorder 19 which also is supplied with indications of refractive index from the receiver 16. A winch 20 is used to control the position of the balloon 11 through a cable 21.

Figure 2:
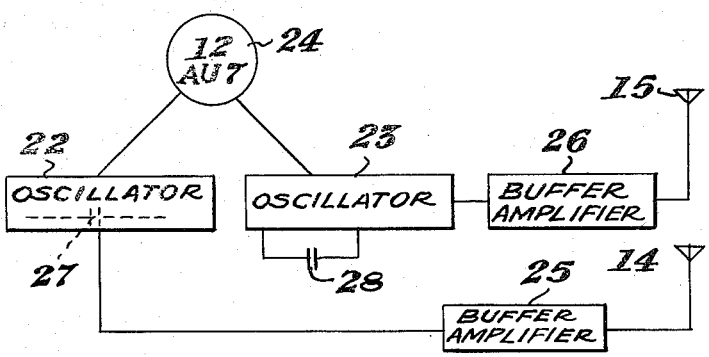
Figure 2 is a block diagram of a refractometer in accordance with the invention.

A block diagram of the circuit of the refractometer 10 is shown in Figure 2. Two separate oscillators 22 and 23 which may be operated at frequencies in the neighborhood of 5 megacycles use a single type 12AU7 tube 24 (double triode). The signal from each oscillator 22 and 23 passes through its own buffer amplifier 25 and 26 respectively to its antenna 14 or 15. The antennas 14 and 15 are the ones shown connected to the refractometer 10 in Figure 1. The frequency of the oscillator 22 is controlled by the capacitance of a ceramic condenser 27 shown in dotted line while the frequency of the oscillator 23 is controlled by the capacitance of an air dielectric condenser 28. The air dielectric condenser 28 is a multiple plate condenser which is exposed to the atmosphere. The capacitance of the air dielectric condenser 28 is proportional to the square of the refractive index of the air between the plates (see the text book "Electromagnetism," McGraw-Hill, New York, J. C. Slater and N. H. Frank, pages 21 and 105), while the capacitance of the ceramic condenser remains relatively constant, so that the frequency difference between the two oscillators 22 and 23 is a measure of the refractive index of the air between the plates of the air dielectric condenser 28. The single tube 24 used for the two oscillators 22 and 23 helps to maintain a constant relation between the frequencies of the two signals over the change in temperatures found in the lower atmosphere. The buffer amplifiers 25 and 26 are used to prevent physical vibrations of the antennas from affecting the frequency of the oscillators 22 and 23.

Figure 3:
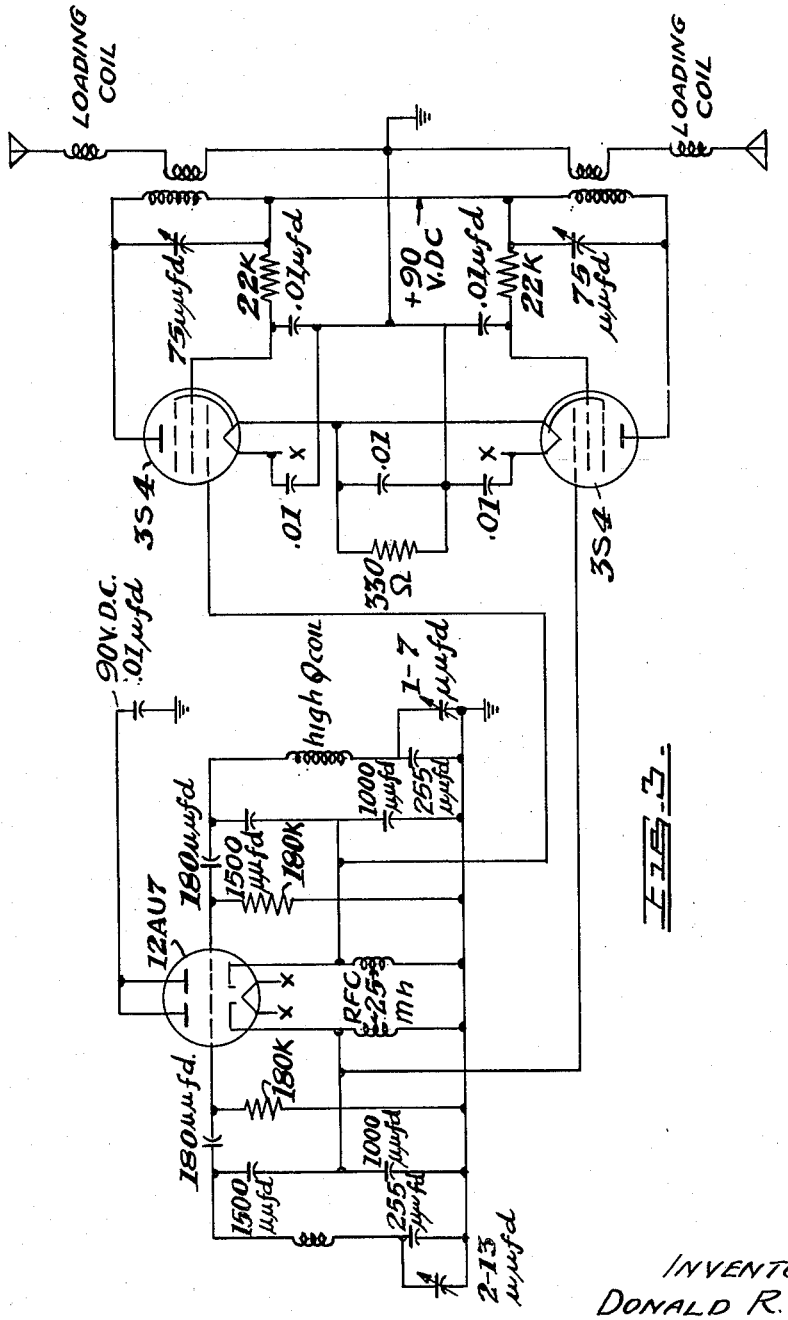
Figure 3 is a circuit diagram of the refractometer shown in block form in Figure 2.

A detailed circuit diagram of the oscillators 22 and 23 is shown in Figure 3 and because the particular circuits shown are of conventional design they will not be described in detail. The oscillators are conventional Clapp oscillators (see the text book "Electronics for Communication Engineers," McGraw-Hill, New York, 1952, J. Markus and V. Zeluff, page 388). The type 3S4 tubes are used in the buffer amplifiers 25 and 26 of Figure 2.

Figure 4:
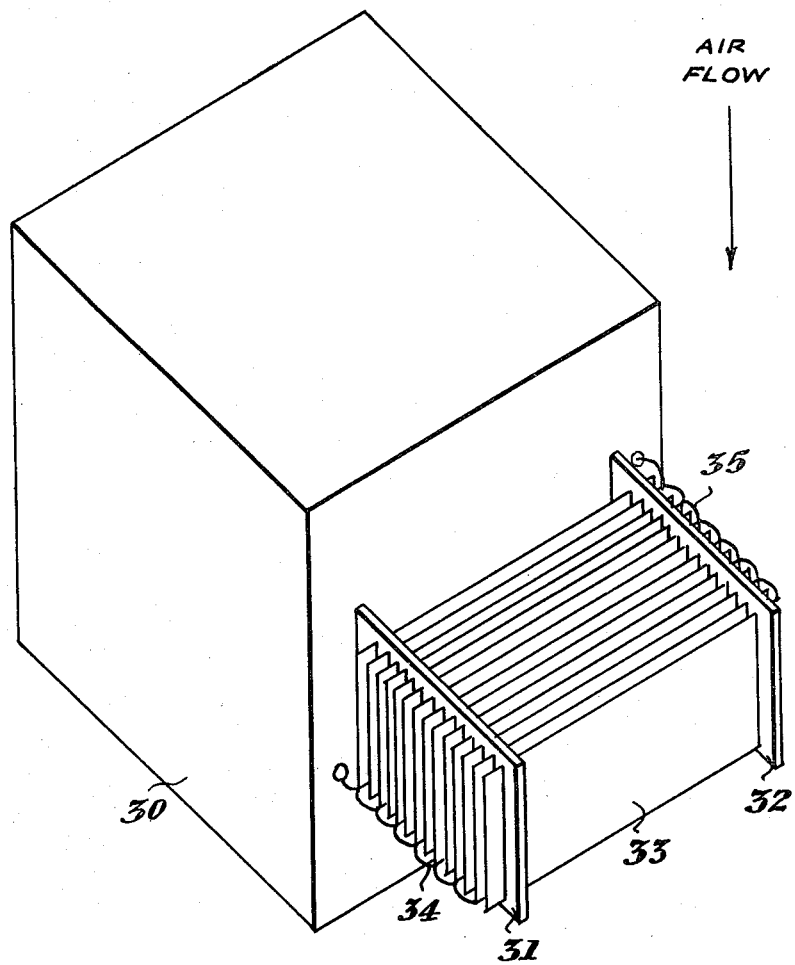
Figure 4 is a perspective diagrammatic view of the air dielectric condenser used to sample the atmosphere.

The physical structure of the air dielectric condenser 28 (Figure 2) and its mounting onto the casing of the refractometer are shown in Figure 4. The refractometer is contained in a casing 30 which preferably is constructed of Bakelite or some other insulating material. The condenser 28 is mounted from the side of the casing 30 by Bakelite spacers 31 and 32 which support the plates 33 in spaced relationship. The plates 33 may be aluminum alloy plates and, for example, in the case of operation at a frequency of 5 megacycles, 9 plates may be used, each plate being 9 inches by 1.5 inches by 0.0625 inch. The spacings between the plates is 0.125 inch. This spacing permits relatively free flow of air between the plates in the direction of the narrower plate dimension during sampling of the air. Electrical connections 34 and 35 are provided from alternate plates to the appropriate connections in the circuit of the oscillator 23. It has been found that a suitable size for the casing 30 in the case of operation at a frequency of 5 megacycles is a 10 inch cube.

The Bakelite spacers 31 used as supports for the plates 33 of the condenser 28 provide temperature compensation within the condenser. It is desirable that the change in capacitance of the condenser 28 depend only upon the air between the plates and not upon changes in the plate dimensions caused by variations in temperature of the air. The capacitance of the parallel plates is inversely proportional to the distance between the plates so that spacers having a positive temperature coefficient of expansion can be used to cause the required temperature compensation. As indicated in Figure 4 the condenser 28 is mounted on the side of the casing 30 rather than on its bottom so that the flow of air through the plates during a balloon ascent is not disturbed by the other parts of the instrument.

Figure 5:
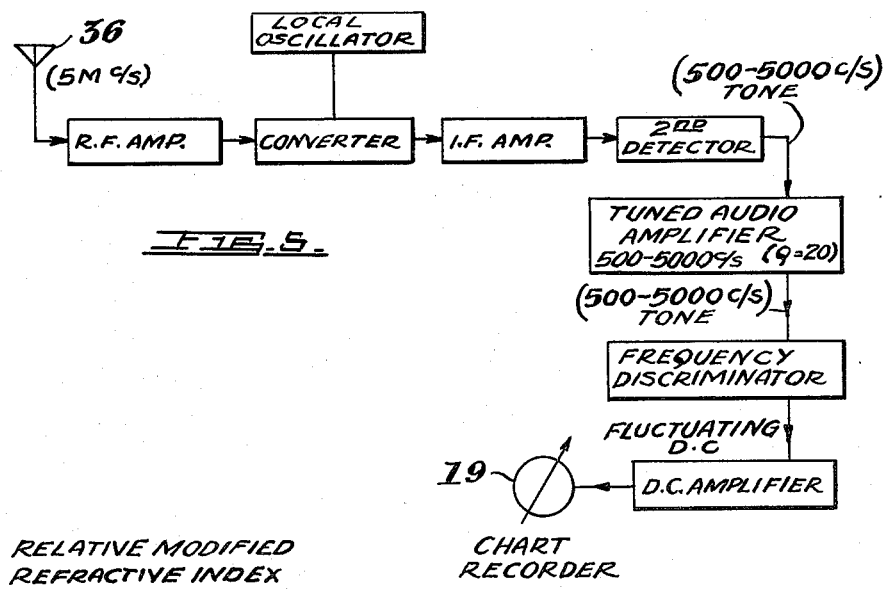
Figure 5 is a block diagram of a recording receiver which may be used in conjunction with a refractometer 10 in accordance with the invention.

A block diagram of a suitable receiver for receiving at the earth's surface signals from the refractometer is shown in Figure 5. All the parts of the circuit of the receiver are of well known design and will not be described in detail. The two radio frequency signals from the refractometer are received on an antenna 36 and are amplified and detected in a conventional manner. The audio difference frequency derived from the two received signals is passed through a tuned audio amplifier, the centre frequency of which is adjusted during operation to pass the required audio tone. Use of a tuned audio amplifier reduces the ambient noise background during the refractometer measurements. The audio tone from the audio amplifier is passed through a frequency discriminator in which the audio tone is converted to a fluctuating direct current signal. The fluctuating direct current signal is then amplified and recorded on the chart recorder 19 (see Figure 1). As mentioned above the chart recorder 19 also receives signals from the tracking radar 18 (Figure 1) so that a chart of the recorder 19 relates the various values of refractive index recorded to the corresponding positions in space of the refractometer.

Figure 6:
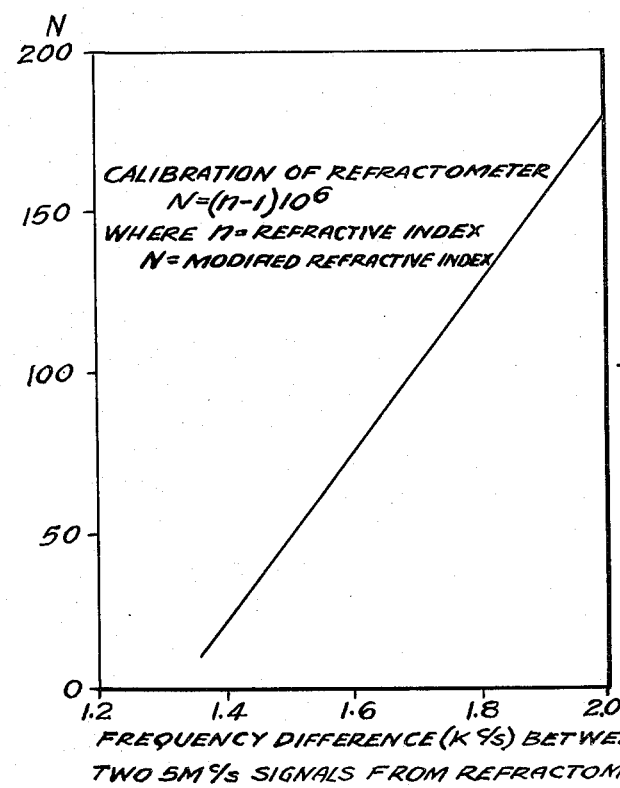
Figure 6 is a graph showing a sample of calibration of a refractometer in accordance with the invention.

The calibration curve of Figure 6 can be obtained theoretically from known calculations based on the constants of the Clapp oscillator circuit, or it may be derived from measurements made with a climate controlled chamber using Equation 1 given above. In use of the apparatus, the refractive index for one known point in space, say the ground point, is determined and the corresponding frequency difference is noted so that subsequent changes in frequency difference indicate changes in refractive index as can be read off the calibration curve.

It has been found that a suitable radio frequency for operation is in the neighborhood of 5 megacycles per second, and the choice of frequency depends upon two factors: the desirability of using a frequency as high as possible to obtain a large change in oscillator frequency for a small change in capacitance of the air dielectric condenser, and the practical upper limit of stable oscillation of the Clapp circuit with this type of external condenser.

It is of great advantage in obtaining refractive index profiles to be able to interpret the measurements obtained from the refractometer directly as refractive index, as is the case with the apparatus just described. There is no need for intermediate computing processes which in the past have required considerable lengths of time. The refractometer just described is capable of measuring relatively fine details in a refractive index profile because of its rapid response time, and repetitive measurements above a given area can be obtained with little difficulty.

What I claim as my invention is:

1. A refractometer comprising an apparatus for use in the earth's atmosphere to signal to a remote location an indication of the refractive index of the earth's atmosphere, means for maintaining the apparatus airborne, said apparatus including a first stable oscillator adapted to produce a first signal of a predetermined radio frequency, a second stable oscillator adapted to produce a second signal of a predetermined radio frequency, the second stable oscillator having a tuned circuit for determining the frequency of the second signal, said tuned circuit including as a tuning element an air dielectric condenser on said apparatus and having a plurality of plates adapted to be exposed so that the earth's atmosphere is the dielectric of the condenser, and means for radiating from said apparatus to said remote location radio frequency signals indicative of the difference frequency between the first signal and the second signal thereby to indicate the refractive index of the earth's atmosphere at the plate of said condenser.

2. A refractometer as claimed in claim 1 and including means for concurrently indicating the position of the airborne apparatus relative to the remote location, whereby information pertaining to the refractive-index of the atmosphere at various known locations of the airborne apparatus is provided.

3. A refractometer as claimed in claim 1 comprising, a casing enclosing the first and the second oscillators, said means for maintaining said apparatus airborne comprising a balloon, said casing being suspended from said balloon, the air dielectric condenser being mounted on a side of said casing with its plates arranged to extend generally in a vertical direction during normal ascent and descent of the balloon.

4. A refractometer as claimed in claim 3 comprising, a water repellant coating on the plates of the air dielectric condenser.

5. A refractometer as claimed in claim 3 in which the plates of the air dielectric condenser are spaced apart by a distance permitting flow of air between the plates during ascent and descent of the balloon.

References Cited in the file of this patent

UNITED STATES PATENTS

| | | |
|---|---|---|
| 2,076,441 | Berry | Apr. 6, 1937 |
| 2,573,870 | Pfund | Nov. 6, 1951 |
| 2,577,779 | Lindberg | Dec. 11, 1951 |
| 2,607,830 | Razek | Aug. 19, 1952 |